3,697,463
VINYL CHLORIDE RESINS STABILIZED WITH METAL COMPOUND-EPOXY COMPOUND-PHOSPHITE COMBINATIONS
Vincent Oakes, Eccleston, St. Helens, and David F. W. Cross, Liverpool, England, assignors to Interstab Limited, Liverpool, England
No Drawing. Filed Sept. 6, 1967, Ser. No. 665,725
Claims priority, application Great Britain, Sept. 8, 1966, 40,114/66, 40,115/66, 40,116/66
Int. Cl. C08f 45/58, 45/62
U.S. Cl. 260—23 XA                                   1 Claim

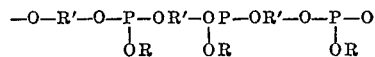

ABSTRACT OF THE DISCLOSURE

Halogen containing resins, e.g., vinyl chloride resins, and diolefin polymers, e.g., butadiene-styrene rubber and acrylonitrile-butadiene-styrene terpolymer are stabilized, e.g., against heat by mixed phosphites having at least one aryl group having an ortho or para directing ring activating substituent and at least one alkyl or alicyclic group. The preferred alkyl or alicyclic group is cyclohexyl. Some of the compounds, particularly those having cyclohexyl groups, are novel per se as are compounds in which the aryl group has an amino, amido, acetyl or acyloxy substituent.

---

The present invention relates to novel phosphites and to the stabilization of polymers with phosphites.

The preparation of monomeric and polymeric phosphites and their use to stabilize polyvinyl chloride, butadiene-styrene copolymers and other hydrocarbon polymers is well known. Thus, Leistner Pat. 2,564,646 shows the stabilization of vinyl resins with tris hydrocarbyl phosphites and Howland Pat. 2,419,354 and Hunter Pat. 2,733,226 show stabilization of butadiene-styrene copolymer and other rubbers with tris aryl phosphites. Friedman Pat. 3,047,608 shows that certain diphosphites are stabilizers for natural rubber. Hechenbleikner Pat. 2,839,563 shows that certain heterocyclic mono and diphosphites containing aryl groups are stabilizers for vinyl chloride resins and diolefin rubbers, while Hechenbleikner Pat. 2,847,443 discloses that mono to tetra phosphites containing aryl groups and pentaerythritol residues are similarly useful, and Hechenbleikner Pat. 2,841,606 discloses tetraaryl glycyl disphosphites have similar utility. Aryl bis polypropylene glycol phosphites and bis aryl polypropylene glycol phosphites are old as shown in Friedman Pat. 3,009,939, but are not disclosed as useful in stabilizing vinyl chloride resins or diolefin containing polymers. Huhn Pat. 3,210,319 shows certain polymeric phosphites as stabilizers for vinyl chloride resins, and Huhn Pat. 3,061,583 shows such use for monomeric phosphites including mixed alkyl aryl (or methoxyphenyl or hydroxyphenyl) phosphites.

Larrison application Ser. No. 522,395, filed Jan. 24, 1966, now Pat. No. 3,341,629, discloses polymers having the basic structure H(OROP)$_n$OROH
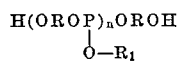

where R is the divalent residue of a dihydric phenol, aromatic dihydric alcohol or hydrogenated dihydric phenol, R$_1$ is aryl, alkyl or haloaryl and $n$ is an integer. Larrison discloses such materials are useful to stabilize vinyl chloride resins and mono and diolefin containing polymers. Sym. (aryl polypropylene glycol) polypropylene glycol diphosphites are shown in Larrison application Ser. No. 436,349, filed Mar. 1, 1965, now Pat. No. 3,354,241, to have similar uses. Nelson Pat. 2,612,488 discloses that polymeric phosphites of the formula $$-O-R'-O-P-OR'-OP-OR'-O-P-O$$
$$\quad\quad\quad\;\; |\quad\quad\quad\;\; |\quad\quad\quad\;\; |$$
$$\quad\quad\quad\;\; OR\quad\quad OR\quad\quad OR$$

where R and R' are aryl and arylene, respectively, are useful as stabilizers for synthetic rubbers.

As can be seen from the above cited patents, organic phosphites have been used for some time for the stabilization of vinyl chloride resins and polymers such as butadiene-styrene rubber and acrylonitrile-butadiene-styrene terpolymer. One of the principal phosphites used commercially as a stabilizer is tris (nonyl phenyl) phosphite. The main drawback to this and similar phosphites is their low hydrolytic stability under alkaline conditions. When phosphites are employed for the stabilization of polymers such as the vinyl chloride resins and diolefin polymers, for example, it is normal practice to add the phosphite to the polymerization mixture which is alkaline. The poor hydrolytic stability of the phosphite can lead to rapid hydrolysis under the conditions of use and thereby render the product useless. Although this constitutes a major problem, the phosphites such as tris (nonyl phenyl) phosphite have continued to be used widely because no other phosphites of greater hydrolytic stability were known.

Accordingly, it is an object of the present invention to develop novel organic phosphites of improved hydrolytic stability.

Another object is to stabilize butadiene-styrene compositions with organic phosphites having improved hydrolytic stability.

An additional object is to stabilize acrylonitrile-butadiene-styrene terpolymers with organic phosphites having improved hydrolytic stability.

A further object is to stabilize halogen containing resins, especially vinyl chloride polymers, with organic phosphites having improved hydrolytic stability.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained through the preparation and use of certain organic mono and polyphosphites having at least one aryl group having at least one ortho-para directing ring activating substituent, and at least one cycloalkyl group. If the aryl group has an amino, amido, carbonyl or carboxy substituent, in place of the cycloalkyl group or groups there can be employed an alkyl group or groups, although preferably a cycloalkyl group is present. There can also be used aryl bis (poly lower alkylene glycol) phosphites as stabilizers for halogen containing resins and diolefin containing polymers such as butadiene-styrene copolymer (e.g., 75:25) and acrylonitrile-butadiene-styrene terpolymer (e.g., 15:25:60).

The products of the present invention can be incorporated in an amount of 0.01 to 20% into halogen containing vinyl and vinylidene resins. Preferably, the resin is a vinyl halide resin, specifically, a vinyl chloride resin. Usually, the vinyl chloride resin is made from monomers consisting of vinyl chloride alone or a mixture of monomers comprising at least 70% vinyl chloride by weight. When vinyl chloride copolymers are stabilized, preferably the copolymer of vinyl chloride with an ethylenicaly unsaturated compound copolymerizable therewith contains at least 10% of polymerized vinyl chloride.

As the chlorinated resin there can be employed chlorinated polyethylene having 14 to 75%, e.g., 27%, chlorine by weight, polyvyinl chloride, polyvinylidene chloride, polyvinyl bromide, polyvinyl fluoride, copolymers of vinyl chloride with 1 to 90%, preferably 1 to 30%, of a copolymerizale ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate, and other alkyl methacrylates, methyl alpha chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-1-chloroethylene, acrylonitrile, allylidene diacetate and chloroallylidene diacetate. Typical copolymers include vinyl chloride-vinyl acetate (96:4 sold commercially as VYNW), vinyl chloride-vinylacetate (87:13), vinyl chloride-vinyl acetate-maleic anhydride (86:13:1), vinyl chloride-vinylidene chloride (95:5), vinyl chloride-diethyl fumarate (95:5), vinyl chloride-trichloroethylene (95:5), vinyl chloride-2-ethylhexyl acrylate (80:20). The organic phosphites of the present invention are particularly useful as secondary heat stabilizers for vinyl chloride polymers such as polyvinyl chloride. Vinyl chloride polymers and copolymers by virtue of being thermoplastic have to be softened by application of heat during fabrication or calendering, extruding, injection molding or similar techniques. This heating is limited in degree and duration by the tendency of the resins to decompose which manifests itself in a deterioration in the physical properties of the resin and a severe darkening in color which, if not corrected would prohibit the use of the resin for light colored and transparent articles. In many instances, it is also necessary to stabilize the resin against weathering from sunlight and rain in articles which have to be subjected to outdoor exposure.

The phosphites of the present invention can be used with virtually all of the broad classes of compounds known in the literature for use as stabilizing agents in vinyl chloride containing polymers.

Thus, the vinyl chloride resin can contain 0.1 to 10% of lead salts such as basic white lead carbonate, di, tri and tetra basic lead sulfate, lead stearate and dibasic lead phosphite.

Of course, there can also be added to the vinyl chloride formulations Group II and III metal salts in an amount of 0.1 to 10% as is conventional in the art. The most common metals used are barium, cadmium, calcium, zinc, aluminum and magnesium, and the soaps are formed from readily available higher fatty acids such as lauric acid and stearic acid and from other acids such as maleic acid, phthalic acid, benzoic acid and phenols such as phenol per se and alkyl phenols. Typical salts include barium laurate, cadmium laurate, zinc stearate, calcium 2-ethylhexoate, barium nonylphenolate, barium octylphenolate, zinc octoate, barium stearate, aluminum stearate, magnesium stearate, calcium phthalate, calcium benzoate, and cadmium maleate.

The metal soaps in normal practice are employed in mixtures such as barium-cadmium, barium-cadmium-zinc, barium-zinc, calcium-zinc and calcium-magnesium-zinc.

Also, there can be employed 0.1 to 10% of organotin compound stabilizers such as dialkyltin oxides and salts, e.g., dialkyltin dilaurates such as dibutyltin dilaurate, dioctyltin dilaurate, dialkyltin maleates such as dibutyltin maleate, dioctyltin maleate, dibutyltin oxide, dioctyltin oxide, dialkyltin mercaptides, e.g., dioctyltin di(octylthioglycolate), dibutyltin di(octylthiopropionate), dialkyltin crytomercaptides, bis (tributyltin) oxide, etc.

Compounds within the classes of lead salts, metal soaps and organotin compounds are recognized as primary stabilizers for vinyl chloride containing polymers. While the organic phosphites are not highly active by themselves as stabilizers, they exhibit synergism with the primary stabilizers, particularly with the metal soaps, as they delay considerably the initial on-set of color formation. It has been suggested that the organic phosphites function by their ability to chelate undesirable metal chlorides which are formed during the stabilization of the polyvinyl chloride, or other vinyl chloride resin, by the primary stabilizers. Thus, e.g., stabilization of polyvinyl chloride with a mixed barium-cadmium laurate would lead to the formation of barium-cadmium chloride which is known to promote degradation of the polyvinyl chloride. The presence of the organic phosphite chelates this metal chloride and, therefore, renders it innocuous.

In order to achieve stabilization, the organic phosphites may be added to the vinyl chloride containing polymer in amounts up to one part per hundred of resin. It is also standard practice, however, to blend together the organic phosphite and metal soap in predetermined proportions along with other synergistic additives if desired and so form stabilization systems which are usually liquids. Triphenyl phosphite was the first organic phosphite to be used for this purpose and has continued to be regarded as a standard secondary stabilizer for polyvinyl chloride. Trialkyl phosphites such as tridecyl phosphite have also been used as secondary stabilizers.

The phosphites according to the invention exhibit far superior properties over the phosphites hitherto used.

A method according to the invention for preparing organic phosphites as specified above comprises heating a triaryl phosphine having at least one ortho-para directing ring activating substituent with one or two molar proportions of an alcohol in the presence of an alkaline catalyst and distilling off the liberated phenol.

Another method for preparing the organic phosphites comprises heating a trialkyl phosphite with from one to three molar proportions of a phenol having at least one ortho-para directing ring activating substituent in the presence of an alkaline or secondary phosphite catalyst, and distilling off the liberated alcohol.

The preparation of the compounds specified may be carried out as follows:

METHOD A

Substituted phenol (3.1 g. mols) was stirred in a glass reactor and phosphorus trichloride (1.0 g. mols) added over a period of approximately 30 minutes at a temperature of 50° C. Vacuum was then applied to the stirred mixture which was heated to 80° C. and maintained there for a period of approximately one hour. During this period most of the hydrogen chloride formed was removed. The temperature was then increased to 200° C. over a period and the excess phenol present in the reaction mixture stripped out. The still residue was then cooled to 100° C., tested for acidity and if greater than 1 was treated with either sodium carbonate or magnesium oxide, stirred for 15 minutes and filtered to afford the desired triaryl phosphite in virtually quantitative yields.

METHOD B

Tri(substituted aryl) phosphite (1 g. mol) and alcohol (1 g. mol or 2 g. mols) were heated together for approximately one hour at 140° C. in the presence of 0.2 g. of an alkaline catalyst, e.g., sodium hydride. Vacuum was then applied to the system and the temperature raised to 200° C. During this period phenol started to distill out from the mixture and the distillation was continued until no more phenol was evolved. A small quantity of filter aid was then added and the mixture filtered to afford the desired mono-alkyl diaryl phosphite or dialkyl monoaryl phosphite in virtually quantitative yield.

METHOD C

Trialkyl phosphite (1 g. mol) (e.g., either trioctyl phosphite or tri-isodecyl phosphite) and substituted phenol (3.1 g. mols) were heated together in the presence of either 0.2 g. of sodium hydride or 0.3 g. of diphenyl phosphite at a temperature of 140° C. for one hour. Vacuum was then applied to the reaction mixture which was heated to 200° C. so as to remove the alcohol by distillation. When all the alcohol has been removed, the still residue was cooled to 100° C. and treated with filter aid and filtered so as to afford the triaryl phosphite in virtually quantitative yield.

By reducing the molar proportion of substituted phenol in this preparation, partially substituted products could be obtained in a manner similar to that described in Method B.

The main choice between using Method B or Method C depended on the relative boiling points of the substituted phenol and the alcohol in question. If the phenol had a lower boiling point, then Method B was used. If the alcohol had the lower boiling point, then Method C was used. As an additional variation, Method B could also be used for making substituted phenyl phosphites from triphenyl phosphite by introducing the substituted phenol in place of the alcohol described in Method B.

Examples of phosphites prepared by the above techniques are given in Table 1.

TABLE 1

| Product | Method | Refractive index |
|---|---|---|
| Bis p-methoxyphenyl isodecyl phosphite | B | 1.5225 |
| p-Methoxyphenyl diisodecyl phosphite | B | 1.4830 |
| p-Dimethylaminomethyl phenyl diisodecyl phosphite | C | 1.4992 |
| Catechyl isodecyl phosphite | B | 1.5100 |
| t-Butylcatechyl isodecyl phosphite | B | |
| Bis p-hydroxyphenyl isodecyl phosphite | B | 1.5325 |
| p-Hydroxyphenyl diisodecyl phosphite | B | 1.4910 |
| o-Hydroxyphenyl diisodecyl phosphite | B | 1.4908 |
| 2-methyl-4-carboxyphenyl diisodecyl phosphite | B | 1.4915 |
| p-Acetamidophenyl diisodecyl phosphite | B | 1.5009 |
| p-Acetylphenyl diisodecyl phosphite | B | 1.4938 |
| p-Acetoxyphenyl diisodecyl phosphite | B | 1.4945 |
| Bis p-nonylphenyl polypropylene glycol molecular weight 425 phosphite | B | 1.4914 |
| p-Nonylphenyl bis (polypropylene glycol molecular weight 425) phosphite | B | 1.4698 |
| p-Nonylphenyl di(cyclohexyl) phosphite | C | 1.5152 |
| Bis (p-nonylphenyl) cyclohexyl phosphite | C | 1.5220 |
| p-t-Butylphenyl di(cyclohexyl) phosphite | C | 1.5241 |
| Bis (2,4-di-t-butylphenyl) cyclohexyl phosphite | C | 1.5246 |
| 2,4-di-t-butylphenyl di (cyclohexyl) phosphite | C | 1.5193 |

The compounds set forth supra were liquids. The refractive indices were determined at 20 to 25° C.

Illustrative examples of making compounds are set forth below.

Unless otherwise indicated, all parts and percentages are by weight.

Example 1

1 g. mol of tri cyclohexyl phosphite and 1 g. mol of p-nonylphenol were heated in the presence of 0.2 gram of sodium hydride at 140° C. for one hour. Vacuum was then applied and the mixture heated to 200° C. to remove all of the cyclohexanol formed. The still residue was cooled to 100° C. and filtered to give p-nonylphenyl di-(cyclohexyl) phosphite as the liquid residue.

Example 2

The procedure of Example 1 was employed but there were used 2 g. mols of the nonyl phenol to give bis (p-nonylphenyl) cyclohexyl phosphite as the liquid residue.

Example 3

The procedure of Example 1 was employed but the nonyl phenol was replaced by 1 g. mol of p-t-butylphenol to give p-t-butylphenyl di(cyclohexyl) phosphite as the liquid residue.

Example 4

The procedure of Example 1 was repeated but in place of the nonylphenol there was used 1 g. mol of 2,4-di-t-butylphenol to form 2,4-di-t-butylphenyl di(cyclohexyl) phosphite as the liquid residue.

Example 5

The procedure of Example 4 was employed but there was used 2 g. mols of the 2,4-di-t-butylphenol to form bis (2,4-di-t-butylphenyl) cyclohexyl phosphite as the liquid residue.

Example 6

1 g. mol of tri (p-nonylphenyl) phosphite was heated with 1 g. mol of polypropylene glycol molecular weight 425 for one hour at 140° C. in the presence of 0.2 gram of sodium hydride. Vacuum was applied and the temperature raised to 200° C. The phenol was distilled from the mixture, the residue filtered and bis (p-nonylphenyl) polypropylene glycol 425 phosphite recovered as the liquid residue.

Example 7

The procedure of Example 6 was repeated using 2 g. mols of the polypropylene glycol 425 to obtain p-nonylphenyl bis (polypropylene glycol 425) phosphite as the liquid residue.

In place of the phosphites prepared in Examples 6 and 7 there can be prepared and used corresponding phosphites from polyalkylene glycols such as diethylene glycol, dipropylene glycol, polypropylene glycol 2025 and the like.

While there were employed p-nonylphenol, 2,4-di-t-butylphenol and p-t-butylphenol as the ortho-para directing ring activating substituent containing phenols in the above examples, there can be used other phenols having such activating groups, e.g., o-cresol, p-cresol, 2,4-xylenol, p-secondary amyl phenol, p-t-amylphenol, o-t-butylphenol, p-dodecylphenol, p-octadecylphenol, p-acetamidophenol, p-aminophenol, p-acetylphenol, 2-methyl-4-carboxyphenol, p-acetoxyphenol, p-methoxyphenol, hydroquinone, catechol, or there can be used as the aromatic phosphites for the ester interchange materials such as tris (p-nonylphenyl) phosphite, tris (p-octylphenyl) phosphite, tris-(p-dodecylphenyl) phosphite, tris (p-acetoxyphenyl) phosphite, tris (p-octadecylphenyl) phosphite, tris (p-t-butylphenyl) phosphite, tris (o-t-butylphenyl) phosphite, tris (p-cresyl) phosphite, tris (2,4-xylenyl) phosphite.

The enhanced hydrolytic stability of many of the compounds used in the present invention makes them of particular value in the stabilization of diolefin polymers such as rubbery butadiene-styrene copolymer (e.g., 60:40 or 75:25) of acrylonitrile-butadiene-styrene terpolymer (ABS, e.g., 10–20% acrylonitrile, 25 to 60% butadiene and 20 to 60% styrene) such as 15% acrylonitrile, 25% butadiene and 60% styrene.

Tris (nonylphenyl) phosphite has been used extensively as a stabilizer for butadiene-styrene rubber and for ABS. The main drawback to this and similar compounds is its low hydrolytic stability under alkaline conditions. When using these phosphites for the stabilization of polymers, it is normal practice to add the phosphite to the polymerization mixture which is alkaline. The poor hydrolytic stability of the phosphite can lead to rapid hydrolysis under the conditions of use and thereby render the product useless. Although this constitutes a major problem, the phosphites such as tris (nonylphenyl) phosphite have continued to be used widely because no other phosphites of greater hydrolytic stability were known. Compounds of the invention which contain at least one alkyl, substituted alkyl, alkoxyalkyl or cycloalkyl group and which have improved hydrolytic stability are valuable as stabilizers for butadiene-styrene rubber and ABS terpolymer. When an alkyl group is present, it usually has at least six carbon atoms and more preferably ten carbons and can be as high as eighteen carbon atoms. Thus, there can be used as stabilizers for the diolefin polymers p-methoxyphenyl diisodecyl phosphite, p-methoxyphenyl di(cyclohexyl) phosphite, bis (p-methoxyphenyl) hexyl phosphite, p-ethoxyphenyl di octadecyl phosphite, as well as the other phosphites disclosed herein. There are normally used 0.1 to 10 parts of phosphite per 100 parts of diolefin polymer (butadiene-styrene rubber or acrylonitrile-butadiene-styrene terpolymer).

In order to determine the hydrolytic stability of the phosphites, the following test was carried out. A recording pH meter was calibrated at pH 7 and pH 9.2 (at 20° C.). The probe was positioned in a 3-neck flask containing 100 grams of 0.003 molar aqueous caustic soda solution. The solution was stirred. The solution had a pH of 11.3±0.1 at ambient temperature. 5 grams of the phosphite to be tested were dissolved in 50 grams of neutral isopropanol. The phosphite solution was added to the caustic solution, a condenser and thermometer fitted to the flask and the flask lowered into a thermostatically controlled water bath at 50° C. ±0.5° C. The mixture was constantly stirred and the time required for the solution to reach pH 7 was measured.

Using this technique several of the new phosphite stabilizers, as well as several known phosphite stabilizers, were examined. The known stabilizers were triphenyl phosphite, bis (p-nonylphenyl) phenyl phosphite, diphenyl isodecyl phosphite, phenyl diisodecyl phosphite and symmetrical hydrogenated bisphenol A phenyl hydrogenated bisphenol A diphosphite (sym. HBPA phenyl HBPA diphosphite). The results are set forth in Table 2.

TABLE 2

| Compound: | Time to reach pH 7 (hours) |
|---|---|
| Triphenyl phosphite | <0.25 |
| Diphenyl isodecyl phosphite | <0.25 |
| Bis (p-nonylphenyl) phenyl phosphite | 1.25 |
| Phenyl diisodecyl phosphite | 2.0 |
| Sym. HBPA phenyl HBPA diphosphite | 1.25 |
| p-Methoxyphenyl diisodecyl phosphite | 4.0 |
| p-Hydroxyphenyl diisodecyl phosphite | 7.5 |
| p-Nonylphenyl bis polypropylene glycol 425 phosphite | 24.75 |
| Bis (p-nonylphenyl) polypropylene glycol 425 phosphite | 3.75 |
| 2,4-di-t-butylphenyl diisodecyl phosphite | 15.5 |
| Tetrakis-(2,4-di-t-butylphenyl) polypropylene glycol 425 phosphite | 10.6 |

As a general rule, it appeared that the compounds containing the most active substituents performed better in polyvinyl chloride than other compounds. Thus, for example, compounds containing the methoxy or tertiary butyl group attached to the phenyl group were extremely effective. Phosphites containing three such activated aryl groups were not as effective as secondary stabilizers as compounds containing only one or two such groups. The cyclohexyl group is the preferred aliphatic group. Higher alkyl groups such as decyl are more useful than lower alkyl groups, e.g., methyl or butyl, in the phosphites.

It has also been found that a mixture of a trisubstituted aryl phosphite with a trialkyl phosphite in molar proportions of either 2:1 or 1:2 would function almost identically to a di-substituted aryl alkyl phosphite or monosubstituted aryl dialkyl phosphite, respectively. It appears from this that under the conditions of fabrication in the polyvinyl chloride, ester interchange is taking place with the resultant formation of the mixed aryl alkyl phosphites which have been found to be the more effective.

Compounds according to the invention were examined as secondary stabilizers for polyvinyl chloride by mixing in the formulations described for 5 minutes on a two roll laboratory mill at 155° C. The resulting hides were then sheeted at 0.050 inch thickness and heated in an air-circulating oven at 185° C. Inspection samples were withdrawn at fixed intervals and examined for color development. The colors were rated on the following scale:

1—colorless
2—faint yellow
3—slight yellow
4—yellow
5—deep yellow
6—amber
7—brown
8—dark brown
9—black Example 8

| | Parts |
|---|---|
| Polyvinyl chloride (Corvic D 65/6 having a K value of 65) | 100 |
| Diisooctyl phthalate | 50 |
| Epoxy soyabean oil | 5 |
| Stanclere 1200 (barium-cadmium laurate soap) | 2 |
| Phosphite | 0.5 |

| Compound | Milling time (minutes) | | | | | |
|---|---|---|---|---|---|---|
| | 30 | 60 | 90 | 120 | 150 | 180 |
| Tri-isodecyl phosphite | 1 | 2 | 2 | 6 | 8 | 9 |
| Diphenyl isodecyl phosphite | 1 | 1 | 2 | 4 | 4 | 7 |
| Bis (p-methoxyphenyl) isodecyl phosphite | 1 | 1 | 1 | 3 | 3 | 4 |
| Tris (p-methoxyphenyl) phosphite | 2 | 2 | 2 | 4 | 4 | 4 |
| Tris (p-methoxyphenyl) phosphite 0.35 Tris isodecyl phosphite 0.15 | 1 | 1 | 1 | 3 | 3 | 4 |

Example 9

| | Parts |
|---|---|
| Polyvinyl chloride (Corvic D 65/6) | 100 |
| Diisooctyl phthalate | 45 |
| Epoxy soyabean oil | 5 |
| Stanclere 1200 | 2 |

| Compound | Amount | Minutes | | | | |
|---|---|---|---|---|---|---|
| | | 20 | 40 | 60 | 80 | 120 |
| Diphenyl isodecyl phosphite | 0.43 | 1 | 2 | 3 | 4 | 7 |
| Bis (p-methoxyphenyl) isodecyl phosphite | 0.43 | 1 | 2 | 2 | 3 | 4 |
| p-(Methoxyphenyl) diisodecyl phosphite | 0.46 | 1 | 1 | 1 | 3 | 4 |
| p-t-Butylphenyl dipropylene glycol phosphite | 0.43 | 1 | 1 | 1 | 3 | 6 |

In this example the phosphite additions were such that the phosphorus content of the mix was constant.

Example 10

| | Parts |
|---|---|
| Polyvinyl chloride | 100 |
| Diisooctyl phthalate | 50 |
| Epoxy soyabean oil | 5 |
| Stanclere 1200 | 2 |
| Phosphite | 0.5 |

| Compound | Minutes | | | | | |
|---|---|---|---|---|---|---|
| | 20 | 40 | 60 | 80 | 100 | 120 |
| Diphenyl isodecyl phosphite | 1 | 1 | 2 | 2 | 6 | 7 |
| p-Methoxyphenyl diisodecyl phosphite | 1 | 1 | 1 | 1 | 3 | 3 |
| p-Hydroxyphenyl diisodecyl phosphite | 1 | 1 | 1 | 1 | 3 | 3 |
| Bis (polypropylene glycol 425 p-nonylphenyl phosphite | 1 | 1 | 2 | 2 | 6 | 6 |
| Tetrakis p-nonylphenyl polypropylene glycol 425 phosphite | 1 | 1 | 1 | 2 | 4 | 5 |
| Tetrakis p-nonylphenyl tripropylene glycol diphosphite | 1 | 1 | 1 | 1 | 3 | 3 |

Example 11

| | Parts |
|---|---|
| Polyvinyl chloride | 100 |
| Diisooctyl phthalate | 47 |
| Epoxy soyabean oil | 3 |
| Barium-cadmium laurate (2:1) | 2 |
| Phosphite | 0.5 |

| Compound | Minutes | | | | | |
|---|---|---|---|---|---|---|
| | 20 | 40 | 60 | 80 | 100 | 120 |
| Tri cyclohexyl phosphite | 1 | 1 | 2 | 2 | 6 | 9 |
| Diphenyl isodecyl phosphite | 1 | 1 | 2 | 2 | 6 | 7 |
| Tri isodecyl phosphite | 1 | 1 | 2 | 3 | 5 | 7 |
| Bis (p-nonylphenyl) cyclohexyl phosphite | 1 | 1 | 1 | 2 | 4 | 5 |
| Di (cyclohexyl) p-nonylphenyl phosphite | 1 | 1 | 1 | 1 | 2 | 3 |
| Di (cyclohexyl) p-t-butylphenyl phosphite | 1 | 1 | 1 | 1 | 2 | 2 |
| Di (cyclohexyl) 2,4-di-t-butylphenyl phosphite | 1 | 1 | 1 | 1 | 1 | 2 |
| Bis (2,4-di-t-butylphenyl) cyclohexyl phosphite | 1 | 1 | 1 | 1 | 2 | 2 |

Example 12

| | Parts |
|---|---|
| Polyvinyl chloride (Corvic D 65/6) | 100 |
| Diisooctyl phthalate | 50 |
| Epoxy soyabean oil | 3 |
| Barium-cadmium laurate | 2 |
| 2,4-di-t-butylphenyl di (cyclohexyl) phosphite | As indicated |

| [2,4-di-t-butylphenyl di (cyclohexyl) phosphite] | | | | | | | |
|---|---|---|---|---|---|---|---|
| | Time (minutes) | | | | | | |
| Parts | 20 | 40 | 60 | 80 | 100 | 120 | 140 |
| 0.05 | 1 | 1 | 2 | 4 | 5 | 9 | 9 |
| 0.1 | 1 | 1 | 2 | 4 | 5 | 8 | 9 |
| 0.15 | 1 | 1 | 1 | 2 | 3 | 5 | 9 |
| 0.2 | 1 | 1 | 1 | 1 | 3 | 5 | 9 |
| 0.25 | 1 | 1 | 1 | 1 | 3 | 5 | 9 |
| 0.3 | 1 | 1 | 1 | 1 | 3 | 4 | 8 |
| 0.35 | 1 | 1 | 1 | 1 | 2 | 3 | 8 |
| 0.4 | 1 | 1 | 1 | 1 | 1 | 3 | 5 |
| 0.45 | 1 | 1 | 1 | 1 | 1 | 2 | 5 |
| 0.5 | 1 | 1 | 1 | 1 | 1 | 2 | 4 |
| Diphenyl isodecyl phosphite | | | | | | | |
| 0.25 | 1 | 1 | 2 | 3 | 6 | 7 | 9 |
| 0.5 | 1 | 1 | 1 | 2 | 5 | 6 | 9 |

Example 13

| | Parts |
|---|---|
| Polyvinyl chloride (Corvic D 65/6) | 100 |
| Diisooctyl phthalate | 50 |
| Epoxy soyabean oil | 3 |
| Calcium-zinc stearate (2:1) | 2 |
| Phosphite | 0.5 |

| Compound | Mintes | | | |
|---|---|---|---|---|
| | 20 | 40 | 60 | 80 |
| Tricyclohexyl phosphite | 1 | 2 | 4 | 9 |
| Diphenyl isodecyl phosphite | 1 | 2 | 3 | 9 |
| Tri-isodecyl phosphite | 1 | 3 | 4 | 9 |
| p-Methoxyphenyl di-isodecyl phosphite | 1 | 1 | 2 | 9 |
| p-Nonylphenyl di (cyclohexyl) phosphite | 1 | 1 | 2 | 9 |
| p-t-Butylphenyl di (cyclohexyl) phosphite | 1 | 1 | 2 | 9 |
| 2,4-di-t-butylphenyl butylphenyl (di(cyclohexyl) phosphite | 1 | 1 | 2 | 9 |
| Bis (2,4-di-t-butylphenyl) cyclohexyl phosphite | 1 | 1 | 2 | 9 |

Example 14

| | Parts |
|---|---|
| Polyvinyl chloride (Corvic D 65/6) | 100 |
| Diisooctyl phthalate | 50 |
| Epoxy soyabean oil | 3 |
| Dibutyltin bis (isooctyl β-mercapto propionate) | 1 |
| Phosphite | 0.5 |

| Compound | Time (minutes) | | | | | |
|---|---|---|---|---|---|---|
| | 20 | 40 | 60 | 80 | 100 | 120 |
| Tricyclohexyl phosphite | 1 | 1 | 2 | 3 | 4 | 6 |
| Diphenyl isodecyl phosphite | 1 | 1 | 2 | 2 | 4 | 6 |
| Triisodecyl phosphite | 1 | 1 | 2 | 2 | 4 | 6 |
| p-Methoxyphenyl diisodecyl phosphite | 1 | 1 | 1 | 2 | 4 | 5 |
| Bis (p-nonylphenyl) cyclohexyl phosphite | 1 | 1 | 1 | 2 | 2 | 4 |
| p-Nonylphenyl di (cyclohexyl) phosphite | 1 | 1 | 1 | 2 | 3 | 4 |
| p-t-Butylphenyl di (cyclohexyl) phosphite | 1 | 1 | 1 | 2 | 3 | 5 |
| 2,4-di-t-Butylphenyl di (cyclohexyl) phosphite | 1 | 1 | 1 | 1 | 2 | 4 |
| Bis (2,4-di-t-butylphenyl) cyclohexyl phosphite | 1 | 1 | 1 | 1 | 2 | 4 |

Example 15

| | Parts |
|---|---|
| Polyvinyl chloride (Corvic D 65/6) | 100 |
| Diisooctyl phthalate | 50 |
| Epoxy soyabean oil | 3 |
| Tribasic lead sulfate | 3 |
| Phosphite | 0.5 |

Because of the opacity imparted to the resin by the basic lead sulfate (the primary stabilizer) a different color coding to that in the foregoing examples was employed as follows:

1—white
2—pale yellow
3—yellow
4—pale orange
5—orange
6—pale orange brown
7—orange brown

| Compound | Minutes | | | | | |
|---|---|---|---|---|---|---|
| | 20 | 40 | 60 | 80 | 100 | 120 |
| Diphenyl isodecyl phosphite | 1 | 3 | 5 | 6 | 7 | 7 |
| Triisodecyl phosphite | 1 | 4 | 6 | 7 | 7 | 7 |
| p-Methoxyphenyl diisodecyl phosphite | 1 | 2 | 3 | 5 | 6 | 7 |
| Bis (p-nonylphenyl) cyclohexyl phosphite | 1 | 2 | 4 | 6 | 7 | 7 |
| p-Nonylphenyl di (cyclohexyl) phosphite | 1 | 2 | 3 | 4 | 7 | 7 |
| p-t-butylphenyl di (cyclohexyl) phosphite | 1 | 2 | 3 | 4 | 6 | 6 |
| 2,4-di-t-butylphenyl di (cyclohexyl) phosphite | 1 | 2 | 3 | 5 | 7 | 7 |
| Bis (2,4-di-t-butylphenyl) cyclohexyl phosphite | 1 | 2 | 3 | 5 | 7 | 7 |

The examples provide adequate proof that the presence of the activated aryl group in the phosphite molecule confers additional stability to the polyvinyl chloride composition. The best results appear to be obtained when only one activated aryl group is present.

The following examples illustrate formulations suitable for giving heat stability to butadiene-styrene copolymer and to acrylonitrile-butadiene-styrene terpolymer. In the examples the butadiene-styrene copolymer was 75:25 and the ABS terpolymer was 15:25:60. In the following examples the phosphite was milled into the diolefin polymer on a rubber mill. However, the phosphite can be added to an aqueous emulsion of the polymer if desired.

Example 16

| | Parts |
|---|---|
| Butadiene-styrene copolymer (75:25) | 100 |
| Phosphite | 1.67 |

Illustrative phosphites which are useful in this example are (a) di (cyclohexyl) p-nonylphenyl phosphite, (b) di (cyclohexyl) p-t-butylphenyl phosphite, (c) di (cyclohexyl) 2,4-di-t-butylphenyl phosphite, (d) cyclohexyl bis (p-nonylphenyl) phosphite, (e) cyclohexyl bis (p-t-butylphenyl) phosphite, (f) cyclohexyl bis (2,4-di-t-butylphenyl) phosphite, (g) p-methoxyphenyl diisodecyl phosphite, (h) p-methoxyphenyl di (cyclohexyl) phosphite, (i) p-hydroxyphenyl diisodecyl phosphite, (j) p-hydroxyphenyl di (cyclohexyl) phosphite, (k) p-nonylphenyl bis (dipropylene glycol) phosphite, (l) p-nonylphenyl bis (polypropylene glycol 425) phosphite, (m) p-t-amylphenyl di (cyclohexyl) phosphite.

Example 17

| | Parts |
|---|---|
| Acrylonitrile-butadiene-styrene terpolymer (15:25:60) | 100 |
| Phosphite | 2 |

Illustrative phosphites which are useful in this example are (a) di (cyclohexyl) p-nonylphenyl phosphite, (b) di (cyclohexyl) p-t-butylphenyl phosphite, (c) di (cyclohexyl) 2,4-di-t-butylphenyl phosphite, (d) cyclohexyl bis (p-nonylphenyl) phosphite, (e) cyclohexyl bis (p-t-butylphenyl) phosphite, (f) cyclohexyl bis (2,4-di-t-butylphenyl) phosphite, (g) p-methoxyphenyl diisodecyl phosphite, (h) p-methoxyphenyl di (cyclohexyl) phosphite, (i) p- hydroxyphenyl diisodecyl phosphite, (j) p-hydroxyphenyl di (cyclohexyl) phosphite, (k) p-nonylphenyl bis (dipropylene glycol) phosphite, (l) p-nonylphenyl bis (polypropylene glycol 425) phosphite, and (m) p-t-amylphenyl di (cyclohexyl) phosphite.

What is claimed is:

1. A stabilized vinyl chloride resin containing in intimate admixture therewith:
   (1) 0.–10% by weight of an epoxy compound,
   (2) 0.1–10% by weight of a metal containing compound selected from the group consisting of lead salts, metal soaps, and organotin compounds, and
   (3) 0.01–20% by weight of a phosphite selected from the group consisting of di(2,4 - di-t-butylphenyl) cyclohexyl phosphite, bis(4-methoxyphenyl) cyclohexyl phosphite, bis(4-methoxyphenyl) secondary octyl phosphite, bis(4-t-butylphenyl) secondary octyl phosphite, and bis(4 - methoxyphenyl) t-butyl phosphite.

References Cited

UNITED STATES PATENTS

| Patent | Date | Name | Class |
|---|---|---|---|
| 2,866,807 | 12/1958 | Boyer et al. | 260—967 |
| 2,877,259 | 3/1959 | Bill | 260—967 |
| 2,919,259 | 12/1959 | Naylor et al. | 260—45.95 |
| 2,951,052 | 8/1960 | Darby | 260—23 |
| 3,009,939 | 11/1961 | Friedman | 260—967 |
| 3,061,583 | 10/1962 | Huhn et al. | 260—45.7 |
| 3,533,975 | 10/1970 | Scullin | 260—23 |
| 3,356,770 | 12/1967 | Larrison | 260—930 |
| 3,467,735 | 9/1969 | Hunter | 260—953 |
| 2,867,594 | 1/1959 | Hansen et al. | 260—23 |
| 2,997,454 | 8/1961 | Leistner et al. | 260—45.8 |
| 2,564,646 | 8/1951 | Leistner et al. | 260—45.7 |
| 2,841,606 | 7/1958 | Hechenbleikner et al. | 260—45.7 |
| 3,039,993 | 6/1962 | Freidman | 260—45.8 |
| 3,047,608 | 7/1962 | Freidman et al. | 260—929 |
| 3,133,043 | 5/1964 | Rosenfelder et al. | 260—45.8 |
| 3,231,531 | 1/1966 | Buckley et al. | 260—23 |
| 3,244,661 | 4/1966 | Kline | 260—29.7 |
| 3,255,136 | 6/1966 | Hecker et al. | 260—23 |
| 3,305,520 | 2/1967 | Fritz et al. | 260—45.7 |
| 3,375,304 | 3/1968 | Larrison | 260—929 |

FOREIGN PATENTS 450,283  8/1948  Canada.

DONALD E. CZAJA, Primary Examiner

R. A. WHITE, Assistant Examiner

U.S. Cl. X.R.

260—45.7 P, 45.75 R, 45.75 K, 45.8 A